United States Patent [19]
Lauritzen et al.

[11] Patent Number: 5,620,205
[45] Date of Patent: *Apr. 15, 1997

[54] GAS GENERATION AND IGNITION SYSTEM FOR AIRBAG INFLATION

[75] Inventors: Donald R. Lauritzen, Hyrum; David J. Green, Brigham City; Robert D. Taylor, Hyrum; Scott C. Mitson, Honeyville, all of Utah

[73] Assignee: Morton International, Inc., Chicago, Ill.

[*] Notice: The term of this patent shall not extend beyond the expiration date of Pat. No. 5,441,705.

[21] Appl. No.: 392,570

[22] Filed: Feb. 23, 1995

Related U.S. Application Data

[63] Continuation-in-part of Ser. No. 259,852, Jun. 15, 1994, Pat. No. 5,387,009, which is a continuation-in-part of Ser. No. 213,176, Mar. 14, 1994, Pat. No. 5,441,705.

[51] Int. Cl.$^6$ .................................................. B60R 21/28
[52] U.S. Cl. .......................... 280/741; 422/164; 422/165; 280/736
[58] Field of Search ................................ 280/741, 736; 422/166, 164, 165; 102/288

[56] References Cited

U.S. PATENT DOCUMENTS

| Re. 12,660 | 6/1907 | Cartridge . | |
|---|---|---|---|
| 2,484,355 | 10/1949 | Parsons | 60/35.6 |
| 2,952,876 | 9/1960 | Miles | 18/30 |
| 3,062,147 | 11/1962 | Davis et al. | 102/70 |
| 3,069,844 | 12/1962 | Bearer | 60/35.6 |
| 3,173,370 | 3/1965 | Landry, Jr. et al. | 102/70 |
| 3,260,208 | 7/1966 | Schluter | 102/98 |
| 3,332,353 | 7/1967 | Burkardt et al. | 102/70 |
| 3,343,921 | 9/1967 | Braun | 422/164 |
| 3,380,251 | 4/1968 | Wall | 60/219 |
| 3,390,210 | 6/1968 | Guenter | 264/3 |
| 3,429,264 | 2/1969 | Oversohl et al. | 102/100 |
| 3,811,358 | 5/1974 | Morse | 86/20 R |
| 3,918,365 | 11/1975 | Arribat | 102/101 |
| 4,005,876 | 2/1977 | Jorgensen et al. | 280/741 |
| 4,094,248 | 6/1978 | Jacobson | 102/100 |
| 4,133,707 | 1/1979 | Andrew | 149/28 |
| 4,154,141 | 5/1979 | Sayles | 86/1 R |
| 4,200,615 | 4/1980 | Hamilton et al. | 422/166 |

(List continued on next page.)

FOREIGN PATENT DOCUMENTS

| 392844 | 6/1991 | Austria . | |
|---|---|---|---|
| 437228 | 7/1991 | European Pat. Off. . | |
| 449506 | 10/1991 | European Pat. Off. . | |
| 505024 | 9/1992 | European Pat. Off. . | |
| 2215604 | 8/1974 | France . | |
| 2573751 | 5/1986 | France . | |
| 2678722 | 1/1993 | France . | |
| 3907089 | 6/1990 | Germany . | |
| 3932576 | 4/1991 | Germany | C06D 5/00 |
| 4317727 | 5/1991 | Germany . | |
| 2263159 | 7/1993 | United Kingdom . | |
| 2268714 | 1/1994 | United Kingdom | B60R 21/20 |

OTHER PUBLICATIONS

A Practical Mathematical Approach to Grain Design; Jet Propulsion; Apr., 1958; pp. 236–244.
Recent Advances in Solid Propellant Grain Design; ARS Journal; Jul., 1959; pp. 483–486.
Combustible Ordnance in the United States; Brochure of Criton Armtec; Publication date unknown; pp. 1–14.
Research Disclosure No. 21505 "Geometric Solid Generant for air bags" Mar. 1982.

*Primary Examiner*—Christopher P. Ellis
*Attorney, Agent, or Firm*—Henry W. Tarring, II; Gerald K. White

[57] ABSTRACT

An inflation system for automotive airbags which comprises a pyrogenic solid grain with igniter strips provided in grooves on its external surface. Upon ignition, the solid grain burns from its external surface inwardly while allowing the generated gas to pass freely from its external surface. Preferably both the pyrogenic solid grain and the igniter strips are extrusions, providing a simplified, less expensive manufacture.

24 Claims, 3 Drawing Sheets

U.S. PATENT DOCUMENTS

| | | | |
|---|---|---|---|
| 4,547,342 | 10/1985 | Adams et al. | 422/166 |
| 4,865,635 | 9/1989 | Cuevas | 55/276 |
| 4,878,690 | 11/1989 | Cunningham | 280/741 |
| 4,945,807 | 8/1990 | Loomans et al. | 86/1.1 |
| 5,022,674 | 6/1991 | Frantom et al. | 280/741 |
| 5,062,367 | 11/1991 | Hayashi et al. | 102/530 |
| 5,259,643 | 11/1993 | Kraft et al. | 280/740 |
| 5,308,370 | 5/1994 | Kraft et al. | 280/740 |
| 5,407,226 | 4/1995 | Lauritzen et al. | 280/728 R |
| 5,407,227 | 4/1995 | Lauritzen et al. | 280/728 R |
| 5,468,016 | 11/1995 | Kobari et al. | 283/741 |

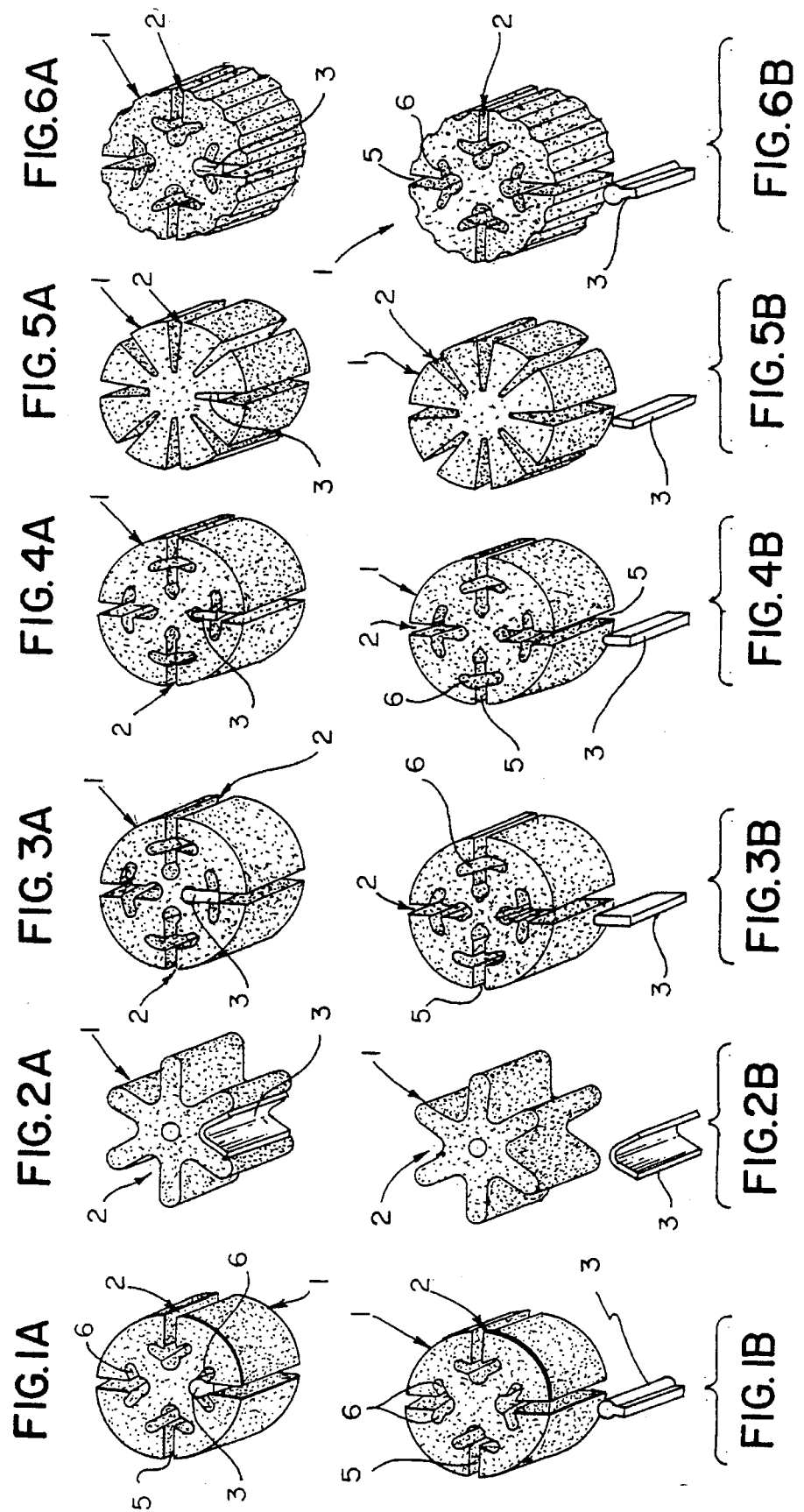

GAS GENERATION AND IGNITION SYSTEM FOR AIRBAG INFLATION

This application is a continuation-in-part of Ser. No. 259,852, filed Jun. 15, 1994, now U.S. Pat. No. 5,387,009, which is a Continuation-in-Part of application Ser. No. 08/213,176, filed on Mar. 14, 1994, now U.S. Pat. No. 5,441,705, issued on Aug. 15, 1995 to Donald R. Lauritzen, David J. Green and Larry D. Rose, entitled "Combined Reaction Can and Inflator with Extruded Generant", and assigned to the assignee of the present application.

FIELD OF THE INVENTION

This invention relates to inflatable airbag passive restraint systems used in vehicles to restrain the movement of occupants in the event of a collision. More particularly, the invention involves improvements in the gas generation system used to provide the gas for inflation of the airbag.

DESCRIPTION OF RELATED ART

Safety restraint systems which actuate from an undeployed state to a deployed state without the need for intervention by the operator, i.e. "passive restraint systems", and particularly those restraint systems incorporating inflatable bags or cushions (commonly referred to as "airbags") have been provided in automotive vehicles. In such systems, one or more airbags are stowed in storage areas within the vehicle's passenger compartment. Upon actuation, the airbag is deployed from its storage area into the passenger compartment through openings in the vehicle interior.

Vehicular inflatable restraint systems normally include at least one crash sensor, generally positioned about the frame and/or body of the vehicle, which serve to sense sudden decelerations of the vehicle. Upon detection of such a sudden deceleration, as would occur in a collision, the airbag or airbags are rapidly inflated and deployed in positions where they serve to protect the driver and/or passengers from injury-causing contact with the interior structure of the vehicle.

An airbag provided for the protection of the vehicle driver, i.e. a driver side airbag, is usually mounted in a storage compartment located in the steering wheel column of the vehicle. An airbag for the protection of a front seat passenger, i.e., a passenger side airbag, is typically mounted in a storage compartment behind the instrument panel/dashboard of the vehicle. Such airbags are housed in an uninflated, folded condition to minimize space requirements. Mounted in close conjunction with the airbags are the necessary elements to cause inflation thereof upon actuation by a crash sensor. A number of devices are known for the inflation of airbags. In one device, a folded airbag is inflated by gas supplied from a container charged with a pressurized supply of inert gas. In another known device, gas is generated by ignition of a pyrogenic gas generating composition, the components of which either decompose or chemically react to generate sufficient gas to inflate one or more airbags in the required time period. A third type of device uses both a stored gas supply and a pyrogenic gas generating composition. In those devices using gas generating compositions, an igniter is required to initiate the generation of the inflation gas by the pyrogenic gas generating composition.

Typical prior art gas generators, or inflators, such as described in U.S. Pat. No. 4,005,876, to Jorgenson et al., and U.S. Pat. No. 4,878,690, to Cunningham, are actuated by an electrical impulse from a crash sensor firing an electric squib centrally located at one end of an elongated cylindrical housing. The firing of the squib lights a long fuse which is located in the center of an elongated metal (steel, stainless steel or aluminum) igniter tube. The long fuse, in turn, ignites a pyrotechnic ignition material located in the igniter tube surrounding the long fuse. The ignition products produced escape the igniter tube through perforations provided therefore and then pass through gas generant material in a combustion chamber which surrounds the igniter tube. The heat from these ignition products initiates the generation of a large quantity of inflation gas from the gas generant material. In these patents the gas generant material is depicted as a plurality of pellets which randomly surround the igniter; however, it is also known to provide such as doughnut or washer-shaped wafers with the igniter passing through the central hole. The generated gas passes from the combustion chamber, through cooling and filtering screens, and from the cylindrical inflator housing, to cause inflation of the airbag. Some igniters, as in Cunningham, further provide a thin aluminum foil about the igniter tube to prevent the granular igniter material from escaping through the perforations in the tube. The foil is suitably thin that it ruptures on ignition, allowing the ignition gases to flow to the gas generant material.

While the prior art gas generant assemblies have provided satisfactory service, they are expensive to fabricate. The present invention provides a different concept of gas generant and igniter configuration and manufacture, which results in a simplified and less expensive fabrication. Additionally, it provides improved consistency of the gas generation characteristics while providing opportunities to adapt, or tailor, the gas generation characteristics for particular applications and benefits.

DESCRIPTION OF THE INVENTION

Objects of the Invention

An object of the present invention is to provide a gas generator, or inflator, which can be manufactured more simply and less expensively than prior art inflators.

A further object is to provide a new relationship between the gas generant material and the igniter which provides for a more consistent control of the gas generation characteristics.

A further object is the provision of gas generant configurations which can be manufactured by extrusion techniques and which provide for (a) improved strength in the resulting reinforced gas generant structures, (b) consistent, but flexible, control over the gas generation characteristics achieved through controllable variables in the design of the gas generant structure, and (c) a simplified, less expensive, fabrication of the inflator assembly.

Another object of the invention is the provision of igniters as solid blocks of igniter material fabricated by, such as, extrusion techniques, which (a) are uniquely complementary to the gas generant structures in which they are used, (b) provide a simplified, less expensive, igniter structure and (c) provide for a simplified, less expensive, fabrication of the inflator assembly.

BRIEF DESCRIPTION OF THE DRAWINGS

FIGS. 1A through 6A are perspective views showing grooved gas generant grains with igniter strips fit within the grooves in the grains.

FIGS. 1B through 6B are exploded views of the corresponding FIGS. 1A through 6A, showing the gas generant grains and igniter strips.

DETAILED DESCRIPTION OF THE INVENTION

Figure 7:
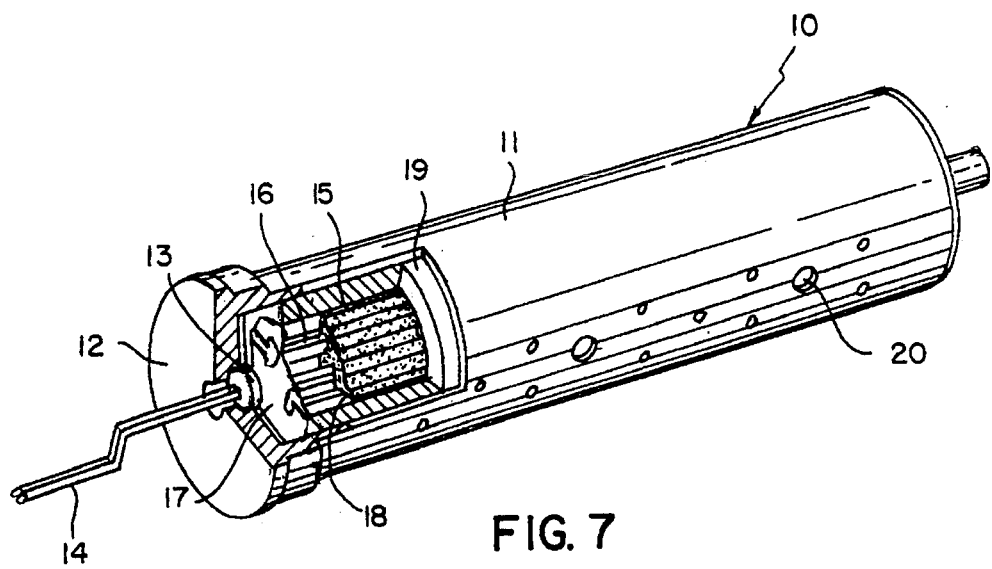
FIG. 7 is a perspective view of a gas generator containing grooved gas generant grains and igniter strips in accord with the present invention.

The present invention provides for the gas generant to be provided as integral solid blocks having grooves in their exterior surface for the deployment therein of solid lengths of igniter material. The configuration of the grooves can be designed to provide for desired gas generation characteristics. Moreover, the configuration of the grooves can be designed to assist in retaining igniters therein during the assembly process. The solid blocks can include binders and reinforcing materials to provide improved levels of structural integrity. Moreover, they can be combined with similarly shaped blocks of relatively inert material to provide design control over the total amount of gas generated in a given inflator structure, thereby alleviating the need for different sized inflator structures whenever a different volume of generated gas is required in individual airbags designed for the differing requirements of different model cars.

Unlike the gas generators of the prior art, the present gas generators are ignited from the periphery of the combustion chamber with the ignition propagating from the periphery, or external surface, toward the center of the chamber. Accordingly, the generated gases can flow from the generator in a more uniform fashion since they are not required to traverse unconsumed gas generant pellets or wafers prior to exiting the combustion chamber, as they are in the prior art gas generators. In the prior art devices relatively high internal pressures can develop in the gas generant which can cause the wafers or pellets to break. The broken pieces of gas generant present more surface area for gas generation than do unbroken pieces of gas generant, resulting in uncontrolled modification of the burn characteristics. The present inflators, with their propagation of burn from the outside-in rather than from the inside-out, avoid such internal pressures and reduce the resultant problem of breakage of gas generant. A high degree of consistency with respect to the gas burn characteristics, such as the gas generation rate, time of burn, burn trace (the plot of gas generation rate as a function of time of burn) and tailoff, is thereby achieved.

The present invention also provides for igniters in shapes which are complementary to the grooves provided in the blocks of gas generant and are greatly simplified over prior art igniters in that they reduce the number of components used therein, substantially diminishing the steps required for igniter assembly. By referring to the igniter's shape as being complementary to the grooves in the gas generant, we mean that the cross-section of the igniter is such that it fits within the groove of the gas generant material and generally conforms to the shape of the groove. Such does not mean that the igniter essentially fills the groove. The presence of free space within the groove provides an opportunity for ignition to be propagated by flames passing along the length of the igniter in such free space. The igniters described herein as having shapes which are complementary to the grooves in the gas generant are intended to include shapes which provide such free space when assembled in the corresponding groove. Igniters suitable for use in the present system are described as one embodiment of the invention disclosed in Patent application Ser. No. 08/392,528 filed by the same inventors on the same day as this application, and entitled "Linear Igniters for Airbag Inflators". That application is assigned to the same assignee as the present application and is hereby incorporated by reference herein.

FIGS. 1 through 6 illustrate gas generant grains 1 having grooves 2 in their outer surface. Suitable igniters 3, in shapes which are complementary to the corresponding grooves in that they are shaped and sized to fit within the groove, are depicted within the grooves in FIGS. 1A through 6A, and are depicted in exploded detail in FIGS. 1B through 6B. The igniters are located in the grooves during assembly. Preferably, a plurality of at least two, and more preferably, at least three, evenly spaced grooves are provided around the periphery of the gas generant grain. It is also preferred that a plurality of igniters be provided in evenly spaced grooves. While it is not necessary for an igniter to be provided in every groove in the gas generant grain, it is preferred that each such grain be provided with at least three evenly spaced igniters.

Since the gas generant releases gas at those surfaces which are at the appropriate elevated temperature, the various configurations, with their varying relative amounts of surface area, have different gas generation characteristics. These characteristics can be suitably tailored for given applications by modifications in the design of the groove configuration. While the prior art gas generators have used washer-shaped wafers to provide some degree of burn tailoring, the degree of consistency and burn control provided by the present invention is substantially greater than that provided by prior art wafers. Aside from the gas generation characteristics, the design of the groove shape is not critical. However, various attributes accompany various types of designs. FIGS. 2 and 5 depict grooves which could be considered to be generally shaped like a wedge, wherein the groove opening at the external surface of the grain is greater than is the opening at any location below the external surface. Such shapes should offer little resistance to the escape of generated gases during initiation of the burn while the igniter is still present and, therefore, should demonstrate smooth initial development of gas generation. The grooves depicted in the grains of FIGS. 1, 3, 4 and 6 all demonstrate a generally cruciform shape which includes a primary slot 5 extending from the external surface of the grain into its interior and auxiliary slots 6 extending from the primary slot within the interior of the grain. When the igniter is present in the relatively narrow primary slot of the generally cruciform shaped groove, the exit of the initially produced ignition gases is somewhat impeded by the igniter providing a localized augmented pressure, which provides a localized increased burn propagation rate of the igniter and gas generant. Moreover, as illustrated in FIGS. 1 and 6, the width of portions of the slots can be sufficiently small that portions of the complementary shaped igniter strips have a greater cross-sectional dimension and are thereby retained in position within the grooves. The grooves in each grain are shown as being identical in FIGS. 1 through 5, however, they can be different within the same grain as shown in FIG. 6. It should be apparent that extensive control of the gas generation characteristics is provided through the selective design of the external grooves of the gas generant grain.

The gas generant grain is produced from known gas generant compositions by processing them in accord with recognized molding and extrusion processes. In this application the term molding is used in the broad sense and is meant to encompass any of the techniques for forming shaped solids in a form defined by forming and/or shaping the solid in a mold, as such it is inclusive of casting and dry pressing processes.

Preferably, the gas generant is formed by an extrusion process. Such provides the grain in a columnar form which can be cut off at any suitable length. Virtually any known gas generant composition can be extruded provided it possess appropriate plasticity at the temperatures and pressures used in the extrusion process. Such plasticity can result either from the melting of one or more components, from the ability of one or more components to plastically deform at the extrusion conditions, or by the addition of a solvent or suspending medium (such as water) which can be volatilized from the finished extruded product.

Suitable compositions for producing the gas generant grain would include a gas generating material, such as a metal azide like sodium azide, or tetrazoles, triazoles, dicyanamide or nitrates; an oxidant, such as iron oxide or other metal oxides or metalloid oxides; and, if necessary or convenient, a binder, such as a dissolved plastic, i.e. nylon dissolved in a suitable solvent, such as a hydrocarbon or oxidized hydrocarbon solvent like acetone; and/or a coolant, such as graphite, alumina, silica or metal carbonate salts. When the gas generant is produced by a molding process, it may be convenient to further include a processing aid and/or release agent, such as graphite powder, mica, molybdenum disulfide, boron nitride or salts of fatty acids, such as calcium or magnesium stearate. The addition of reinforcing fibers, such as graphite or fiberglass fibers, provides an enhanced structural integrity. Further conventional additives, such as lubricants, can be included for their conventional purposes.

The following gas generant powder compositions were blended with 17.2% water to provide a mixture of plastic consistency, which was extruded through a 0.375 inch diameter three-lobed die providing a pattern similar to that of a stemless three leaf clover.

|  | Mix 1 | Mix 2 | Mix 3 | Mix 4 |
| --- | --- | --- | --- | --- |
| Component |  |  |  |  |
| Sodium azide | 68.80 | 67.42 | 67.42 | 66.04 |
| Ferric oxide | 20.75 | 20.34 | 20.34 | 19.92 |
| Sodium nitrate | 5.05 | 4.95 | 4.95 | 4.85 |
| Aluminum oxide | 2.02 | 1.98 | 1.98 | 1.94 |
| Silicon dioxide | 0.35 | 0.34 | 0.34 | 0.34 |
| Bentonite | 3.03 | 4.97 | 2.97 | 4.91 |
| Mica | 0.00 | 0.00 | 2.00 | 2.00 |
| Characteristics |  |  |  |  |
| wt/length (gm/in) |  | 1.65 | 1.57 | 1.60 |
| linear burn rate (in/sec) | 3.95 | 3.82 | 3.72 | 4.01 |
| mass burn rate (gm/sec) |  | 6.30 | 5.84 | 6.42 |

(Burn rates determined at 1000 psi.)

The igniters can also be produced as molded or extruded shapes, extrusion again being preferred. A particularly advantageous embodiment results when the gas generant and igniter are extruded together. Conventional igniter materials, such as the conventional mixture of 25% finely divided boron and 75% potassium nitrate can be provided as an extrudable mixture by mixing with methanol and water, and a possible addition of a binder, such as either nylon dissolved in a solvent or bentonite. More recently developed igniter materials, such as igniter compositions based on nitrocellulose, can also be used. The ends of the igniter strip which are intended to be contacted by the ignition products of the squib initiator or by the similar ignition products of the auto-ignition means can be treated with a sensitizing material. The igniter should be formed in a shape which is complementary to the shape of the grooves provided in the gas generant grain. Preferably, as illustrated in FIGS. 1 and 6, the igniter is shaped such that it will be retained in the groove of the generant grain.

A gas generator, or inflator, in accord with the present invention, and particularly suitable for use with a passenger side airbag, is illustrated in FIG. 7. The inflator 10 comprises a cylindrical inflator housing 11 which is closed at one end by cap 12. Squib 13 is mounted to the interior of cap 12 and is electrically connected to conventional collision sensors (not shown) by electrical conductors 14 which pass through cap 12. A solid extruded gas generant grain 15 is centrally located along the longitudinal axis of the inflator housing. The gas generant grain ends a short distance from cap 12, defining an initiation chamber 17 with cap 12 and the interior of the inflator housing 11. The extruded igniter strips 16 are located within grooves 18 which extend into the gas generant grain 15 from its exterior surface. A filter 19 surrounds the gas generant grain 15. The inflator housing includes ports or holes 20 which allow the generated gas to pass from the inflator housing to the interior of the conventional airbag (not shown).

Figure 8:
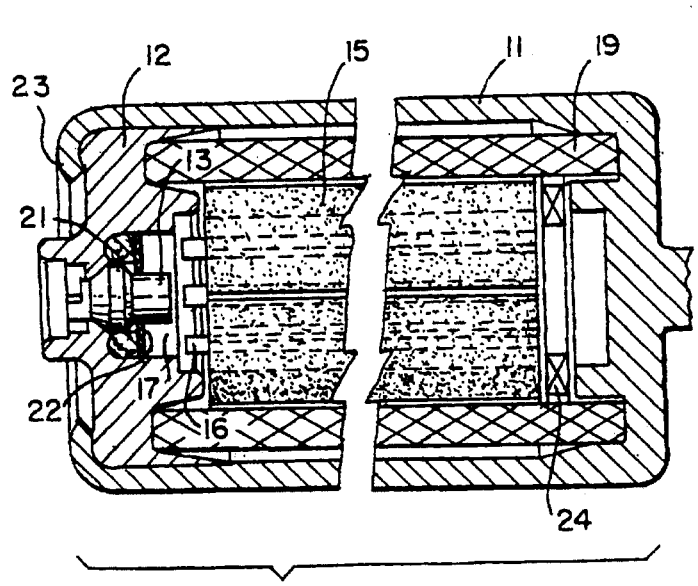
FIG. 8 is a front view of a gas generator containing gas generant grain and igniter strips in accord with a preferred embodiment of the present invention.
Figure 9:
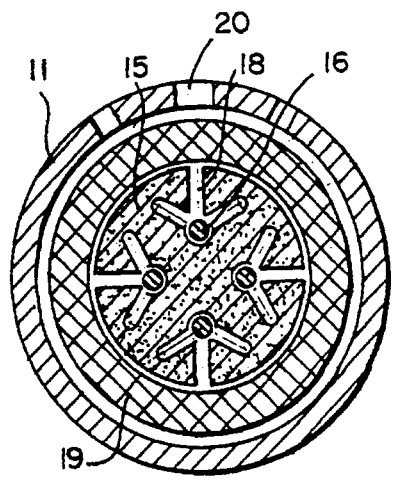
FIG. 9 is a side view of the gas generator shown in FIG.

A further gas generator in accord with this invention, as illustrated in FIGS. 8 and 9, also includes an auto-ignition means, as is often provided in prior art gas generators. The elements of the gas generator in these figures are identified by the same item numbers as used in FIG. 7 to indicate like elements. Auto-ignition means are commonly provided in generators which use structural components made of aluminum. The auto-ignition means includes a material which is formulated to spontaneously combust at a temperature in the range of 300° to 450° F., preferably in the range of 350° to 400° F., thereby activating the gas generant. Such auto-ignition assures that, in the event of a vehicle fire, the gas generator is activated at a temperature at which the housing, typically made of aluminum, has not significantly lost its mechanical strength. Such auto-ignition means can be located at either end of the gas generant grain, provided the ignition products thereof are directed against an exposed portion of the igniter strip(s). Preferably, as shown in the gas generator of FIGS. 8 and 9, the auto-ignition means is provided contiguous to the initiation chamber 17. Such auto-ignition means includes a suitable material 21 having the desired spontaneous combustion property, such as suitably selected nitrocellulose, provided in a groove in cap 12 encircling squib 13. The auto-ignition material 21 is held in place by an overlying screen 22, which permits the ignition products produced by the auto-ignition material to pass into the initiation chamber 17. The igniter strips 16 extend past the end of the gas generant grain 15 and into the initiation chamber 17 to provide more extensive contact of the igniter strips with the initiation products provided by activation of either squib 13 or auto-ignition material 21. The cap 12 in this embodiment fits in the interior of cylindrical housing 11 and is held in place by swaging the end of housing 11 over the exterior of cap 12, resulting in a swage stake 23. A preload assembly 24 is also provided in this embodiment. The preload assembly is formed of a relatively resilient material, such as a compressed woven metal or a spring washer, in order that it exert a sufficient compressive force on the gas generant to hold it firmly in place, thereby avoiding noisy rattles and product attrition that would result from an excessively loose construction.

When the vehicle is involved in a collision, the sensors provide an electrical impulse to conductors 14, causing the squib 13 to fire releasing its ignition products in the initiation chamber 17. The ends of igniter strips 16 facing the initiation chamber are thereby ignited and such ignition is virtually instantaneously passed along the length of the igniter strip. Ignition of the igniter strip provides the hot gases necessary to initiate the pyrogenic reactions which consume the gas generant grain 15 releasing the relatively large quantity of gas required to inflate the airbag. Such gases pass through the filter 19 wherein they are cooled and any particulate matter removed, and then pass through ports 20 in the inflator housing, to the interior of the airbag causing same to inflate. In the event of a vehicle or garage fire or similar exposure of the vehicle to elevated temperatures, the relatively high thermal conductivity of metal cap 12 provides efficient transfer of the elevated ambient temperature surrounding the gas generator to the auto-ignition material 21, causing it to ignite. The ignition products produced pass through screen 22 into initiation chamber 17, wherein they contact and activate igniter strips 16.

Figure 10:
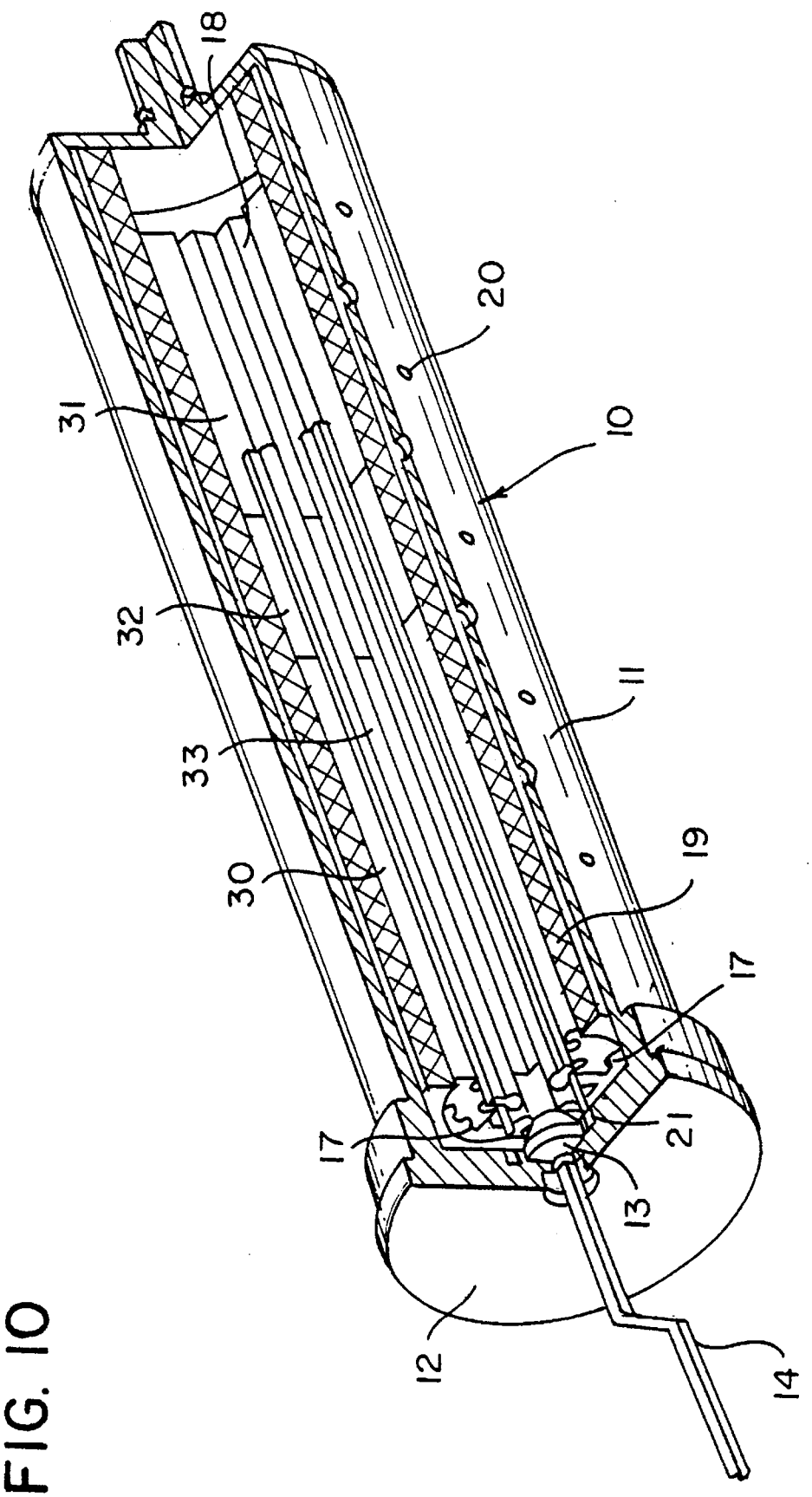
FIG. 10 is a perspective view, partially in section, of a preferred gas generator in accord with this invention.

A further preferred embodiment of the invention is shown in FIG. 10, wherein like components are identified by like item numbers. In this embodiment the gas generant structure comprises at least two integral solid bodies, 30, 31. Additionally, one or more similarly shaped auxiliary solid bodies 32 having substantially different gas generating properties are provided. In the most preferred version of this embodiment, two of the gas generant solid bodies are provided, one on each side of a similarly shaped auxiliary body made of a material which, on actuation of the inflator, produces essentially no gas, and is essentially inert with respect to the gas generation function. This arrangement further permits design control, through selection of the gas generant charge, over the gas generation characteristics of the inflator, particularly with respect to the total amount of gas generated. By selecting appropriate lengths of an inert auxiliary solid body 32, the total amount of gas generated can be controlled without a need to redesign or resize the remainder of the inflator assembly. Accordingly, a single inflator housing design can be used in a variety of applications despite the differing requirements of different airbag configurations and sizes as are typically associated with different vehicle models and the changes thereto from year to year.

The inert shaped auxiliary body 32 can be formed by extrusion of a suitable inert material, such as a salt mixture, i.e. a sodium chloride based mixture or a mixture of a major amount of dicalcium orthophosphate with minor amounts of stearic acid and magnesium stearate, or it can be formed by any compatible forming technique. It is preferred that such inert shaped auxiliary body have sufficient resilience that it apply sufficient compressive force on adjacent gas generant solid bodies 30, 31 to hold them firmly in place over the extended design lifetime of modern vehicles, thereby avoiding the noisy rattles and product attrition that would result from excessively loose structural components. Such can be provided by a shaped body formed from compressed woven or non-woven metal fibers.

The provision of an inert shaped auxiliary body 32 provides additional design flexibility achieved through the selection of ignition strips 33. In some airbag configurations it is desirable to provide a delay during the gas generation step, such as to allow the bag to initially be released by breaking through weak sections provided in its housing and, only subsequent thereto, being fully charged with its inflation gas. In such case the ignition strip 33 extends from initiation chamber 17 through the first gas generant solid body 30, the inert shaped auxiliary body 32 and ends shortly after entering the second gas generant solid body 31. Since the gas generant materials have a much slower flame propagation rate than do the igniter materials, the second gas generant solid body 31 will not ignite as rapidly as it would with the ignition strip extending through its entire length. The second gas generant solid body may also have a substantially different cross-section than that of the first gas generant solid body, thereby providing further opportunity to control, or tailor, the burn characteristics. In other embodiments, a primary and a secondary ignition strip having a different ignition rates can be arranged end to end in the same groove. Such a different ignition rate can be provided either by providing the secondary ignition strip entirely of a different formulation or by merely providing a segment of such strip of a formulation having a different ignition rate.

In addition to the advantages discussed herein, other advantages of the present invention will be apparent to those skilled in the art. It is also apparent that many variations and modifications can be made to the described invention without departing from its spirit and scope. Accordingly, the foregoing description is intended to be illustrative only, rather than limiting. The invention is to be limited only by the scope of the following claims.

We claim:

1. In an airbag inflator which comprises a gas generating solid grain and an igniter strip to ignite said gas generating solid grain, the improvement comprising said gas generating solid grain having at least one groove on its external surface, said groove being shaped to receive an igniter strip having a shape complementary to at least a portion of the shape of said groove; and wherein said gas generating solid grain does not contain any cavities capable of containing an igniter strip other than said at least one groove on its external surface.

2. The airbag inflator as defined in claim 1, wherein said gas generating solid grain is a molded solid grain.

3. In an airbag inflator which comprises a gas generating solid grain and an igniter strip to ignite said gas generating solid grain, the improvement comprising said gas generating solid grain having at least one groove on its external surface, said groove being shaped to receive an igniter strip having a shape complementary to at least a portion of the shape of said groove, and wherein said gas generating solid grain is elongated and has a substantially constant cross-section along its elongated axis.

4. The airbag inflator as defined in claim 3, wherein said elongated gas generating solid grain comprises a single integral solid body.

5. The airbag inflator as defined in claim 3, wherein said elongated gas generating solid grain comprises at least two integral solid bodies.

6. The airbag inflator as defined in claim 5, wherein the elongated axis of all of said integral solid bodies lie on the same line.

7. In an airbag inflator which comprises a gas generating solid grain and an igniter strip to ignite said gas generating solid grain, the improvement wherein said gas generating solid grain is elongated having a substantially constant cross-section along its elongated axis and has at least one groove on its external surface, said groove being shaped to receive said igniter strip having a shape complementary to at least a portion of the shape of said groove, said elongated gas generating solid grain comprising at least two integral solid bodies and further comprising at least one auxiliary solid body having substantially the same cross-section as said at least two solid bodies of elongated gas generating solid grain, and wherein said auxiliary elongated body is made of a material having substantially different gas generating properties than is provided by the material of said gas generating solid grain.

8. The airbag inflator as defined in claim 7, wherein said auxiliary solid body is made of a material which produces substantially no gas upon activation of the inflator.

9. The airbag inflator as defined in claim 7, wherein said auxiliary solid body is provided such that its elongated solid axis lies on substantially the same line as does the elongated axis of said integral solid bodies of gas generating solid grain.

10. In an airbag inflator which comprises a gas generating solid grain and an igniter strip to ignite said gas generating solid grain, the improvement comprising said gas generating solid grain having at least one groove on its external surface, said groove being shaped to receive said igniter strip having a shape complementary to at least a portion of the shape of said groove and said groove having a shape which holds said igniter strip within said groove.

11. In an airbag inflator which comprises a gas generating solid grain and an igniter strip to ignite said gas generating solid grain, the improvement comprising said gas generating solid grain having at least one groove on its external surface, said groove being shaped to receive an igniter strip having a shape complementary to at least a portion of the shape of said groove, and at least one of said igniter strips being retained in said groove by a portion thereof which is wider than a part of said groove which is located closer to the grain surface than is said portion of said igniter strip.

12. The airbag inflator as defined in claim 10, wherein said groove comprises a primary slot extending from the external surface of said gas generating solid grain into the interior of said grain.

13. The airbag inflator of claim 11, wherein said groove further comprises auxiliary slots extending from said primary slot within the interior of said grain.

14. The airbag inflator of claim 13, wherein said groove is in a generally cruciform shape.

15. The airbag inflator of claim 14, wherein said igniter strip is formed as a solid body of an ignition material.

16. The airbag inflator of claim 15, wherein said igniter strip is formed as an extrusion of said ignition material.

17. The airbag inflator of claim 15, wherein said igniter strip is formed by molding said ignition material.

18. The airbag inflator of claim 15, wherein said strip igniter extends the full length of said at least one groove.

19. In an airbag inflator which comprises a gas generating solid grain and an igniter strip to ignite said gas generating solid grain, the improvement comprising said gas generating solid grain having at least one groove on its external surface, said groove being shaped to receive said igniter strip having a shape complementary to at least a portion of the shape of said groove, and at least one of said igniter strips located within at least one of said grooves, with at least one end of said igniter strip extending past at least one end of said at least one groove.

20. The airbag inflator of claim 19, which further comprises an initiation means capable of initiating ignition in response to activation by a signal transmitted from a sensor and wherein said extension of said strip igniter extends into a space wherein it would be contacted by ignition products produced by activation of said initiation means.

21. The airbag inflator of claim 19, which further comprises an auto-ignition means which is capable of initiating ignition when activated by the inflator reaching a temperature in the range of 300° to 450° F., and wherein said extension of said igniter strip extends into a space wherein it would be contacted by the ignition products produced by activation of said auto-ignition means.

22. In an airbag inflator which comprises a gas generating solid and at least one igniter strip to ignite said gas generating solid, wherein said gas generating solid comprises at least two integral solid bodies, each having at least one groove on its external surface, and at least one of said igniter strip in said at least one groove in at least one of said integral solid bodies.

23. An airbag inflator as defined in claim 22, further comprising an auxiliary solid body formed of a material which provides gas generating characteristics substantially different from those of said gas generating solid.

24. An airbag inflator as defined in claim 23, wherein the material of said auxiliary solid body produces essentially no gas during activation of the airbag.

* * * * *

UNITED STATES PATENT AND TRADEMARK OFFICE
CERTIFICATE OF CORRECTION

PATENT NO. : 5,620,205
DATED      : April 15, 1997
INVENTOR(S) : Lauritzen, et. al.

It is certified that error appears in the above-identified patent and that said Letters Patent is hereby corrected as shown below:

Col. 3, Ln. 10, correct "FIG." to read -- FIG. 8 -- .
Col. 4, Ln. 8, correct "08/392,528" to read -- 08/392,578 -- .

Col. 10, LN. 21, correct "strip igniter" to read -- igniter strip --.

Signed and Sealed this

Seventh Day of April, 1998

Attest:

BRUCE LEHMAN

Attesting Officer

Commissioner of Patents and Trademarks